(12) United States Patent
Hu et al.

(10) Patent No.: US 11,663,819 B2
(45) Date of Patent: May 30, 2023

(54) IMAGE PROCESSING METHOD, APPARATUS, AND DEVICE, AND STORAGE MEDIUM

(71) Applicant: TENCENT TECHNOLOGY (SHENZHEN) COMPANY LIMITED, Guangdong (CN)

(72) Inventors: Yi Fan Hu, Shenzhen (CN); Shi Lei Cao, Shenzhen (CN); Ye Feng Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 196 days.

(21) Appl. No.: 17/376,382

(22) Filed: Jul. 15, 2021

(65) Prior Publication Data
US 2021/0342629 A1    Nov. 4, 2021

Related U.S. Application Data

(63) Continuation of application No. PCT/CN2020/094482, filed on Jun. 5, 2020.

(30) Foreign Application Priority Data

Jun. 14, 2019    (CN) .......................... 201910514603.6

(51) Int. Cl.
*G06V 20/00*    (2022.01)
*G06F 18/2113*    (2023.01)
(Continued)

(52) U.S. Cl.
CPC .......... *G06V 20/00* (2022.01); *G06F 18/2113* (2023.01); *G06V 10/764* (2022.01); *G06V 10/806* (2022.01); *G06V 10/82* (2022.01)

(58) Field of Classification Search
CPC ........... G06T 5/20; G06T 5/002; H04N 19/14; H04N 19/196
See application file for complete search history.

(56) References Cited

U.S. PATENT DOCUMENTS 7,911,515 B2 *    3/2011    Ito ........................ H04N 23/843
                                                           348/262
8,139,883 B2 *    3/2012    Zhang ....................... G06T 5/20
                                                           382/254
(Continued)

FOREIGN PATENT DOCUMENTS

CN    108460426 A    8/2018
CN    108764142 A    11/2018
(Continued)

OTHER PUBLICATIONS

International Search Report for PCT/CN2020/094482, dated Sep. 7, 2020.

*Primary Examiner* — Yosef Kassa
(74) *Attorney, Agent, or Firm* — Sughrue Mion, PLLC

(57) ABSTRACT

An image processing method, apparatus, and device, and a storage medium are provided. The method is performed by a computing device, and includes: determining a first image feature of a first size of an input image, the first image feature having at least two channels; performing weight adjustment on each channel in the first image feature by using a first weight adjustment parameter, to obtain an adjusted first image feature, the first weight adjustment parameter including at least two parameter components, and each parameter component being used for adjusting a pixel of a channel corresponding to each parameter component; downsampling the adjusted first image feature to obtain a second image feature having a second size; combining the first image feature and the second image feature to obtain a (Continued)

combined image feature; and determining an image processing result according to the combined image feature.

20 Claims, 8 Drawing Sheets

(51) Int. Cl.
   *G06V 10/764* (2022.01)
   *G06V 10/80* (2022.01)
   *G06V 10/82* (2022.01)

(56) References Cited

U.S. PATENT DOCUMENTS

| | | | | |
|---|---|---|---|---|
| 8,189,012 B2* | 5/2012 | Yang | ............... | H04N 23/68 |
| | | | | 345/611 |
| 8,213,746 B2* | 7/2012 | Volovelsky | ........... | G06T 3/4076 |
| | | | | 345/698 |
| 8,305,471 B2* | 11/2012 | Bechtel | ................. | H04N 25/53 |
| | | | | 348/222.1 |
| 8,718,336 B2* | 5/2014 | Yamaguchi | ............. | G06T 5/005 |
| | | | | 382/165 |
| 9,159,119 B2* | 10/2015 | Shechtman | .......... | H04N 23/651 |
| 2018/0293706 A1 | 10/2018 | Viswanathan et al. | | |

FOREIGN PATENT DOCUMENTS

| | | | |
|---|---|---|---|
| CN | 109829506 A | 5/2019 | |
| CN | 110211205 A | 9/2019 | |

* cited by examiner

IMAGE PROCESSING METHOD, APPARATUS, AND DEVICE, AND STORAGE MEDIUM

CROSS-REFERENCE TO RELATED APPLICATION(S)

This application is a bypass continuation application of International Application No. PCT/CN2020/094482, filed on Jun. 5, 2020, which claims priority to Chinese Patent Application No. 201910514603.6, filed with the China National Intellectual Property Administration on Jun. 14, 2019, the disclosures of which are incorporated by reference in their entireties.

FIELD

The disclosure relates to the field of image processing, and specifically, to an image processing method, apparatus, and device, and a storage medium.

BACKGROUND

A computing device may process pixel information in an image to obtain semantic information contained in the image. For example, image classification processing may be performed on the image to determine whether content contained in the image belongs to a preset category. In another example, image segmentation processing may be performed on the image to recognize a specific region in the image. In still another example, object detection processing may be performed on the image to recognize a specific target object included in the image, and a category to which the target object belongs may be further outputted. By using the foregoing various image processing methods, the computing device may extract various semantic information in the image.

SUMMARY

An objective of the disclosure is to provide an image processing method, apparatus, and device, and a storage medium.

According to an aspect of the disclosure, an image processing method is provided, performed by a computing device, the method including: receiving an input image; determining a first image feature of a first size of the input image, the first image feature having at least two channels; determining a first weight adjustment parameter corresponding to the first image feature, and performing weight adjustment on each channel in the first image feature by using the first weight adjustment parameter, to obtain an adjusted first image feature, the first weight adjustment parameter including at least two parameter components, and each parameter component being used for adjusting a pixel of a channel corresponding to each parameter component; downsampling the adjusted first image feature to obtain a second image feature having a second size, the second size being smaller than the first size; combining the first image feature and the second image feature to obtain a combined image feature; and determining an image processing result according to the combined image feature.

According to another aspect of the disclosure, an image processing apparatus is further provided, including: a receiving unit, configured to receive an input image; a feature determining unit, configured to determine a first image feature of a first size of the input image, the first image feature having at least two channels; an adjustment unit, configured to determine a first weight adjustment parameter corresponding to the first image feature, and perform weight adjustment on each channel in the first image feature by using the first weight adjustment parameter, to obtain an adjusted first image feature, the first weight adjustment parameter including at least two parameter components, and each parameter component being used for adjusting a pixel of a channel corresponding to each parameter component; a downsampling unit, configured to downsample the adjusted first image feature to obtain a second image feature having a second size, the second size being smaller than the first size; a combining unit, configured to combine the first image feature and the second image feature to obtain a combined image feature; and a result determining unit, configured to determine an image processing result according to the combined image feature.

According to still another aspect of the disclosure, an image processing device is further provided, including a memory and a processor, the memory storing instructions, the instructions, when executed by the processor, causing the processor to perform the foregoing method.

According to still another aspect of the disclosure, a non-transitory computer-readable storage medium is further provided, storing instructions, the instructions, when executed by a processor, causing the processor to perform the foregoing method.

BRIEF DESCRIPTION OF THE DRAWINGS

To describe the technical solutions in example embodiments of the disclosure more clearly, the following briefly describes accompanying drawings for describing the example embodiments. The accompanying drawings in the following description show merely some embodiments of the disclosure, and a person of ordinary skill in the art may still derive other drawings from these accompanying drawings without creative efforts. The following accompanying drawings are not deliberately drawn to scale according to the actual size, and a focus is demonstrating the main idea of the disclosure.

DETAILED DESCRIPTION

To make the objectives, technical solutions, and advantages of the embodiments of the disclosure more comprehensible, the following clearly and completely describes the technical solutions in the embodiments of the disclosure with reference to the accompanying drawings in the embodiments of the disclosure. The described embodiments are a part rather than all of the embodiments of the disclosure. All other embodiments obtained by a person of ordinary skill in the art based on the embodiments of the disclosure without creative efforts shall fall within the protection scope of the disclosure.

Unless otherwise defined, the technical terms or scientific terms used herein are to have general meanings understood by a person of ordinary skill in the field of the disclosure. The "first", the "second", and similar terms used in the disclosure do not indicate any order, quantity or significance, but are used to only distinguish different components. Similarly, "include", "including", or similar terms mean that elements or items appearing before the term cover elements or items listed after the term and their equivalents, but do not exclude other elements or items. A similar term such as "connect" or "connection" is not limited to a physical or mechanical connection, but may include an electrical connection, whether direct or indirect. "Up", "down", "left", "right", and the like are merely used for indicating relative positional relationships. When absolute positions of described objects change, the relative positional relationships may correspondingly change.

Figure 1:
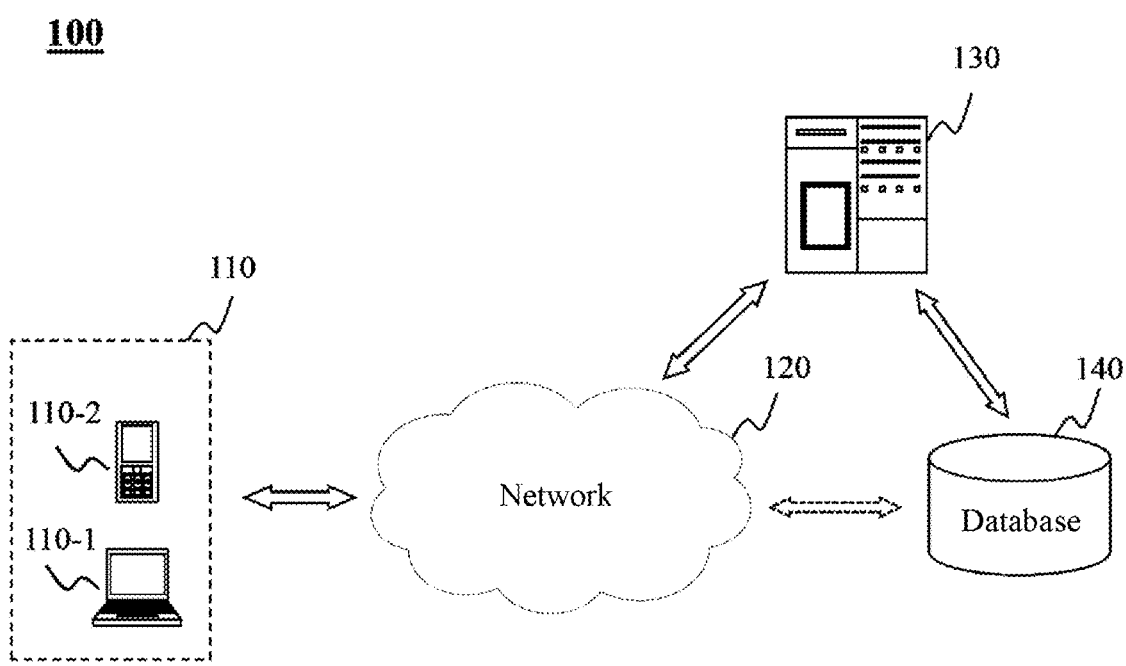
FIG. 1 is an example scenario diagram of an image processing system according to the disclosure.

FIG. 1 is an example scenario diagram of an image processing system according to the disclosure. As shown in FIG. 1, an image processing system 100 may include a user terminal 110, a network 120, a server 130, and a database 140.

The user terminal 110 may be, for example, a computer 110-1 and a mobile phone 110-2 shown in FIG. 1. It would be understood that the user terminal 110 may be any other type of electronic device that may perform data processing, and may include, but not limited to, a desktop computer, a notebook computer, a tablet computer, a smartphone, a smart home device, a wearable device, an in-vehicle electronic device, and a monitoring device. The user terminal may alternatively be any equipment provided with an electronic device, for example, a vehicle or a robot.

The user terminal 110 provided according to the disclosure may be used for receiving an image, and implementing image processing by using a method provided in the disclosure. For example, the user terminal 110 may capture an image to be processed through an image capture device (for example, a camera or a video camera) disposed on the user terminal 110. In another example, the user terminal 110 may alternatively receive an image to be processed from an image capture device disposed independently. In still another example, the user terminal 110 may alternatively receive an image to be processed from a server through a network. An image described herein may be an individual image or a frame in a video.

In some embodiments, an image processing method provided in the disclosure may be performed by using a processing unit of the user terminal 110. In some implementations, the user terminal 110 may perform the image processing method by using an application program built in the user terminal 110. In some other implementations, the user terminal 110 may perform the image processing method by calling an application program stored outside the user terminal 110.

In some other embodiments, the user terminal 110 sends a received image to the server 130 through the network 120, and the server 130 performs the image processing method. In some implementations, the server 130 may perform the image processing method by using an application program built in the server. In some other implementations, the server 130 may perform the image processing method by calling an application program stored outside the server.

The network 120 may be a single network or a combination of at least two different networks. For example, the network 120 may include, but not limited to, one of or a combination of more than one of a local area network, a wide area network, a public network, a private network, and the like.

The server 130 may be an individual server or a server cluster, and servers in the cluster are connected by a wired or wireless network. The server cluster may be centralized, for example, a data center, or distributed. The server 130 may be local or remote.

The database 140 may generally refer to a device having a storage function. The database 140 is mainly used for storing various data used, generated, and outputted during operating of the user terminal 110 and the server 130. The database 140 may be local or remote. The database 140 may include various memories, for example, a random access memory (RAM) and a read-only memory (ROM). The storage devices mentioned above are only some listed examples, and storage devices that may be used by the system are not limited thereto.

The database 140 may connect to or communicate with the server 130 or a part thereof through the network 120, or directly connect to or communicate with the server 130, or a combination of the foregoing two manners is used.

In some embodiments, the database 140 may be an independent device. In some other embodiments, the database 140 may be alternatively integrated in at least one of the user terminal 110 and the server 130. For example, the database 140 may be disposed on the user terminal 110 or may be disposed on the server 130. In another example, the database 140 may alternatively be distributed, a part thereof is disposed on the user terminal 110, and another part is disposed on the server 130.

The system provided in FIG. 1 may be used to implement image processing on an image, such as image classification, image segmentation, and target detection.

A process of an image processing method provided in the disclosure is described below in detail.

Figure 2:
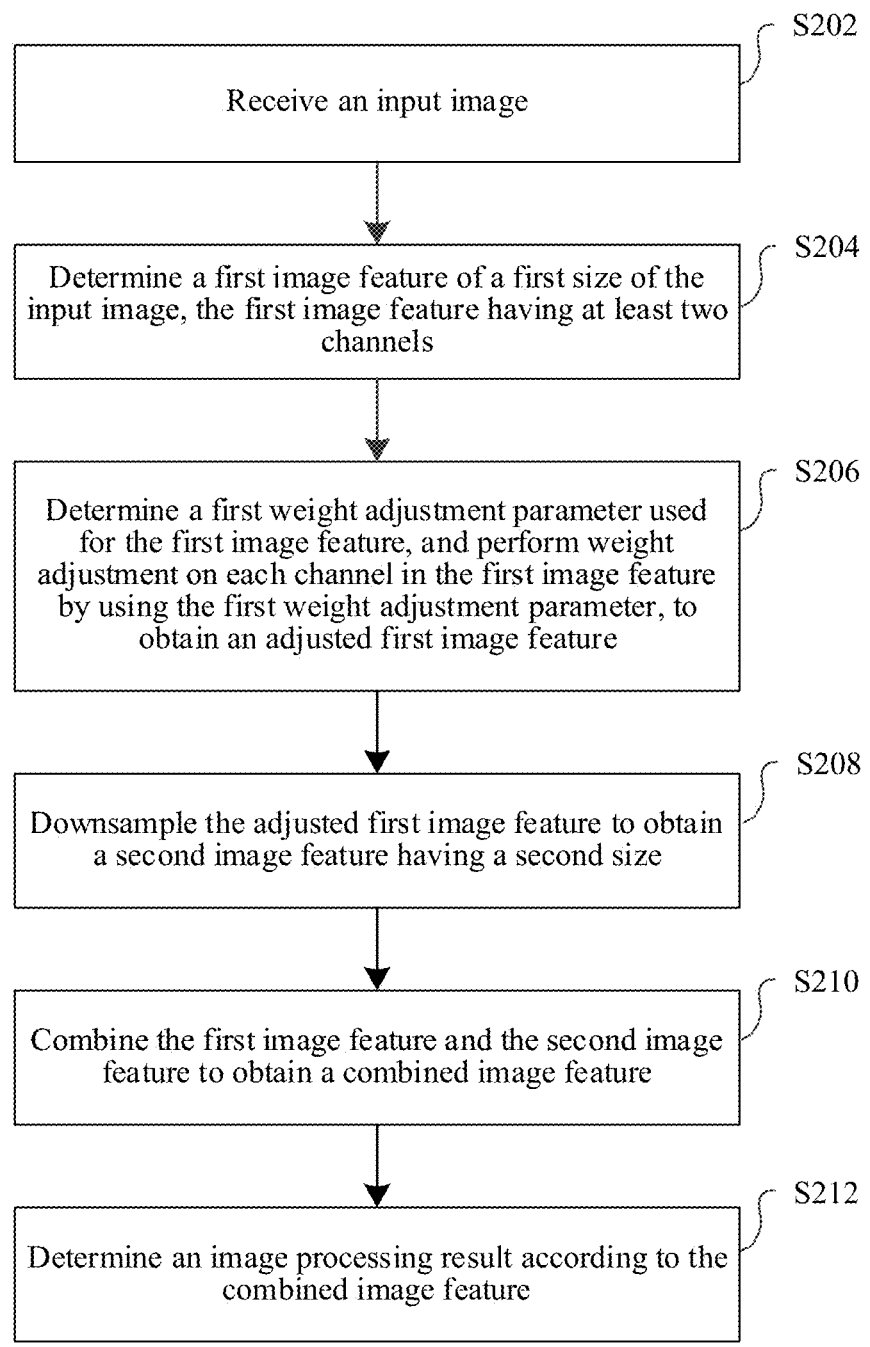
FIG. 2 is a schematic flowchart of an image processing method according to an embodiment of the disclosure.

FIG. 2 is a schematic flowchart of an image processing method according to an embodiment of the disclosure. The method shown in FIG. 2 may be performed by a computing device shown in FIG. 8.

In operation S202, an input image may be received. In some embodiments, an image capture device may be used to capture the input image. In some other embodiments, the input image may be alternatively read from a storage device that stores pictures.

The input image described herein may contain various image information. For example, the input image may be an image and/or video in a driving process acquired by an in-vehicle image capture device. In another example, the input image may be a surveillance image and/or surveillance video acquired by a monitoring device. In still another example, the input image may be an image generated by a medical instrument by using CT, MRI, ultrasound, X-ray, electrocardiogram, electroencephalogram, optical photography, or the like.

In some embodiments, the input image may be black and white, or color. For example, when the input image is a black and white image, the input image may have a single channel. In another example, when the input image is a color image, the input image may have at least two channels (such as R, G, and B).

In operation S204, a first image feature of a first size of the input image may be determined, the first image feature having at least two channels.

The first image feature may have the same size as that of the input image, or may have a size different from that of the input image.

In some embodiments, the first image feature may be determined by performing convolution processing on the input image. A specific form of performing convolution processing on the input image is not limited in the disclosure herein. For example, modules of a VGG series network, a Resnet series network and/or an Inception series network may be used to perform convolution processing on the input image at least once to obtain the first image feature. In the disclosure, a Resnet module is used as an example to explain the principle of the disclosure. However, it would be understood that any one of the foregoing network modules or any other network module capable of extracting image features may be used to replace the Resnet module in the disclosure.

In operation S206, a first weight adjustment parameter used for the first image feature may be determined, and weight adjustment is performed on each channel in the first image feature by using the first weight adjustment parameter, to obtain an adjusted first image feature, the first weight adjustment parameter including at least two parameter components, and each parameter component being used for adjusting a pixel of a channel corresponding to each parameter component.

Figure 3A:
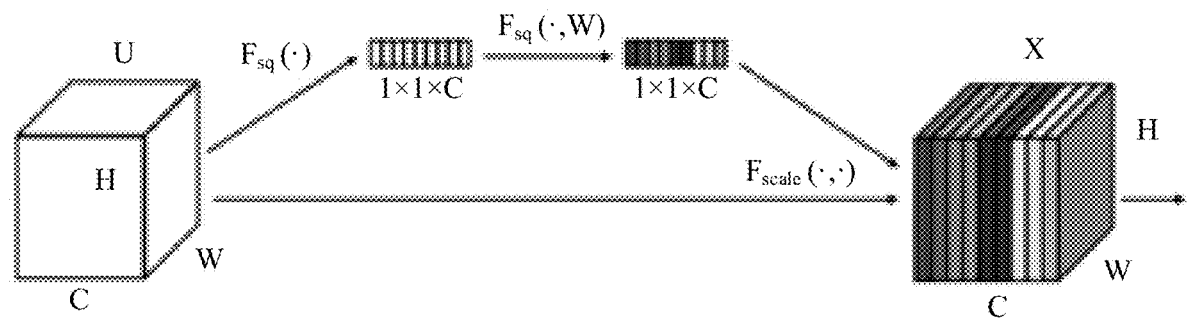
FIG. 3A shows a schematic process of performing weight adjustment on a first image feature according to an embodiment of the disclosure.

FIG. 3A shows a schematic process of performing weight adjustment on a first image feature according to an embodiment of the disclosure.

As shown in FIG. 3A, the first image feature may be a tensor U with a size of H×W and a quantity of channels of C. H and W may be sizes with pixel quantities as units, and C is a positive integer. A squeeze operation ($F_{sq}$) may be performed on the first image feature U to convert the tensor with the size of H×W and the quantity of channels of C into an output vector z with a size of 1×1×C. The output vector z includes C elements of $z_1$, $z_2$, ..., and $z_c$. A $k^{th}$ element $z_k$ in the output vector z may be used to represent a global feature parameter of a $k^{th}$ channel of the first image feature. For each channel in the at least two channels in the first image feature, the $F_{sq}$ operation may be used to determine a global feature parameter of each channel. In some embodiments, the $F_{sq}$ operation may be implemented as global average pooling, and the $F_{sq}$ operation may be implemented by using the following formula:

$$z_k = \frac{1}{W \times H} \sum_{i=1}^{W} \sum_{j=1}^{H} u_k(i, j), \quad (1)$$

where W represents a quantity of pixels of the first image feature in a first direction (for example, a row direction), H represents a quantity of pixels of the first image feature in a second direction (for example, a column direction), and $u_k$(i, j) is a value of an element in an $i^{th}$ row and $j^{th}$ column on the $k^{th}$ channel. $z_k$ represents the $k^{th}$ element of the output vector z.

As can be seen, the $F_{sq}$ operation is implemented by using the formula (1) to obtain the distribution of elements of the image feature on each channel, that is, the global information of the image feature on each channel.

Then, the global feature parameter of each channel may be used to determine a parameter component used for adjusting a pixel of a channel corresponding to the parameter component.

For example, an excitation operation ($F_{ex}$) may be performed on the output vector z. According to the $F_{ex}$ operation, the first weight adjustment parameter used for each of the at least two channels may be determined by using the global feature parameter. In some embodiments, the $F_{ex}$ operation may include first multiplying a matrix W1 with a dimension of C/r×C by z to implement an operation of a fully connected layer. C is a quantity of elements of the output vector z, and r is a scaling parameter. In an implementation, r may take a value of 16. Then, an output of the operation of the fully connected layer may be caused to pass through a ReLU (rectified linear unit) layer. Further, an output of the ReLU layer may be multiplied by a matrix W2 with a dimension of C×C/r (which is equivalent to an operation of a fully connected layer), and finally the output processed by the matrix W2 is caused to pass through a sigmoid function to obtain an output s.

The output s obtained in the foregoing manner may represent a weight of a feature map of each channel in the tensor U of the first image feature. The output s has C elements of $s_1$, $s_2$, ..., and $s_c$, and a value of a $k^{th}$ element of the output s represents a parameter component of the $k^{th}$ channel in the first image feature.

By using the output s, weight adjustment may be performed on the first image feature U. For example, for the $k^{th}$ channel in the first image feature U, values of all elements in the $k^{th}$ channel may be multiplied by the value of the $k^{th}$ element in the output s to obtain an adjusted feature of the $k^{th}$ channel. By performing the foregoing weight adjustment on each channel in the first image feature U, the adjusted first image feature may be obtained.

Figure 3B:
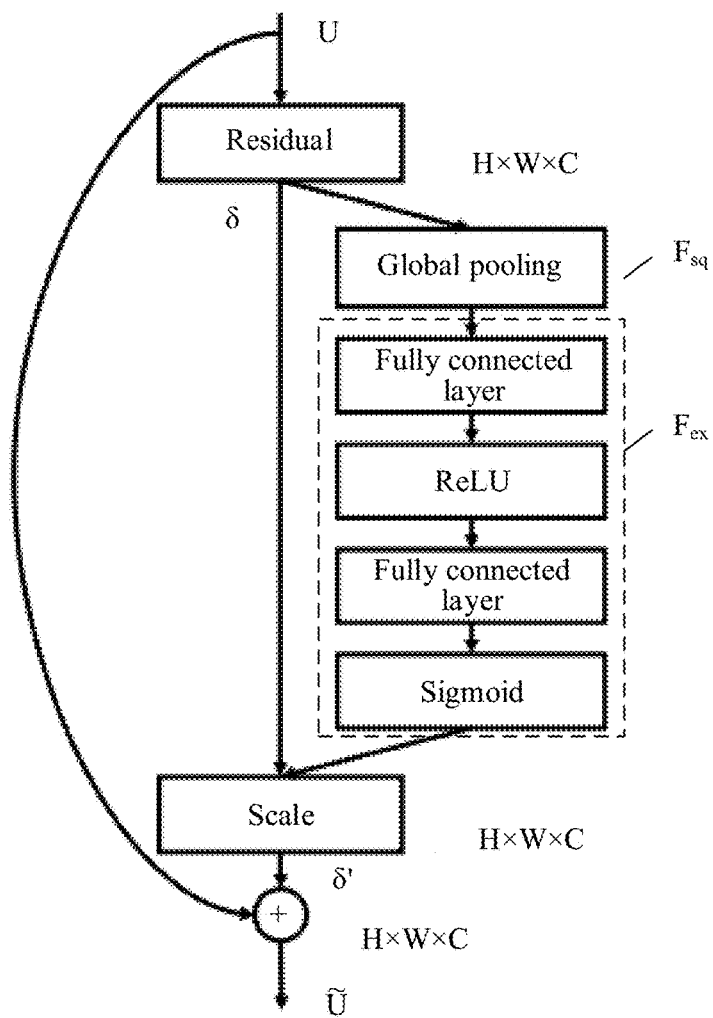
FIG. 3B shows another schematic process of performing weight adjustment on a first image feature according to an embodiment of the disclosure.

FIG. 3B shows another schematic process of performing weight adjustment on a first image feature according to an embodiment of the disclosure. When the Resnet module is used to process the input image to determine the image feature, the weight adjustment process shown in FIG. 3A may be combined with the Resnet module.

As shown in FIG. 3B, a residual module may be used to process the first image feature U, where the first image feature U may be a tensor with a size of H×W and a quantity of channels of C. H and W may be sizes with pixel quantities as units, and C is a positive integer.

Then, the $f_{sq}$ operation (the global pooling layer in FIG. 3B) and the $F_{ex}$ operation (the fully connected layer implemented by using the matrix W1, the ReLU layer, the fully connected layer implemented by the matrix W2, and the sigmoid layer that are included in FIG. 3B) may be performed on the first image feature U processed by the residual module, to determine the first weight adjustment parameter used for at least two channels of the first image feature U.

As shown in FIG. 3B, by using the residual module to process the first image feature U, a residual δ of the first image feature U may be obtained. Further, the residual δ may be scaled by using the first weight adjustment parameter outputted by the sigmoid layer, to obtain an adjusted residual δ'. The adjusted residual δ' is added to the inputted first image feature U to obtain a result Ũ after the addition. By equating Ũ with the inputted first image feature U, the module shown in FIG. 3B may implement the function of the Resnet module. Therefore, by using the structure shown in FIG. 3B, the weight adjustment process may be added to the Resnet module.

Referring back to FIG. 2, in operation S208, the adjusted first image feature may be downsampled to obtain a second image feature having a second size, the second size being smaller than the first size. The second image feature has at least two channels, and a quantity of channels of the second image feature is greater than a quantity of channels of the first image feature.

For M×N first pixels in the adjusted first image feature, a first pixel vector corresponding to the M×N first pixels is determined, the first pixel vector including elements of the M×N first pixels in the at least two channels, M and N being positive integers, and a product of M and N being a positive integer greater than 1. Then, the first pixel vector may be mapped by using a full-rank first matrix to obtain the mapped first pixel vector. Further, a second pixel in the second image feature may be determined according to the mapped first pixel vector. A quantity of channels of the second image feature may be determined according to a quantity of elements of the mapped first pixel vector. For example, the quantity of channels of the second image feature may be equal to the quantity of elements of the mapped first pixel vector.

Figure 4A:
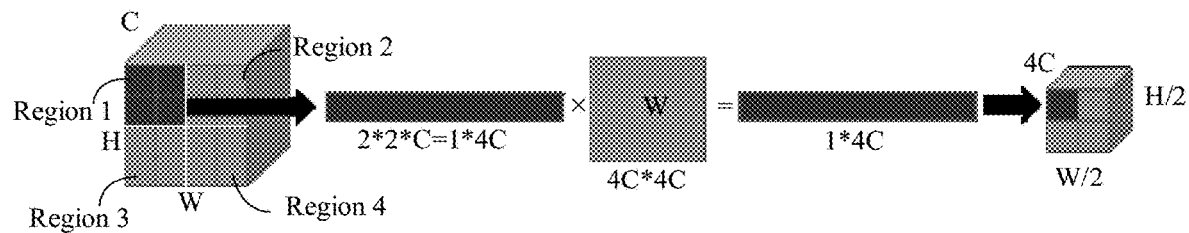
FIG. 4A shows an example process of downsampling according to an embodiment of the disclosure.

FIG. 4A shows an example process of downsampling according to an embodiment of the disclosure. In FIG. 4A, the principle of the disclosure is described by using an example in which the adjusted first image feature is a tensor with a size of H×W and a quantity of channels of C. H and W may be sizes with pixel quantities as units, and C is a positive integer.

As shown in FIG. 4A, a process of 2× downsampling is described by using four pixels in a 2×2 arrangement in the adjusted first image feature as an example. For a region 1 in FIG. 4A, by determining values of elements of the 2×2 pixels on the C channels, the 2×2×C elements may be arranged into a one-dimensional vector with a size of 1×1×4C, that is, a pixel vector used for the 2×2 pixels. Then, a first matrix with a size of 4C×4C may be used to map the pixel vector of the 2×2 pixels, to obtain a new mapped pixel vector with a size of 1×4C. Then, by using the mapped pixel vector with the size of 1×4C, a pixel with an element of 4C channels may be obtained, that is, a pixel in the image feature obtained after downsampling.

According to the process shown in FIG. 4A, after sequentially processing other pixels in the adjusted first image feature (for example, each pixel in a region 2, a region 3, and a region 4 shown in FIG. 4A), a tensor with a size of H/2×W/2 and a quantity of channels of 4C may be obtained as a second image feature obtained by downsampling the adjusted first image feature.

As can be seen, the parameter matrix used in the downsampling process provided in the disclosure is a square matrix with a size of N×N (in the example of FIG. 4A, N=4C), so that the mapping used in the downsampling process is a full-rank transformation, thereby transferring the image feature without loss of information. In the example shown in FIG. 4A, if a rank of the parameter matrix is less than 4C, loss of image information is caused in the mapping process. On the contrary, if the rank of the parameter matrix is greater than 4C, a quantity of parameters in the mapping process increases, but an amount of information in the image does not increase. Therefore, the full-rank matrix is used to implement the parameter transformation in the downsampling process, to transfer the image information with a small quantity of parameters without losing information.

Although FIG. 4A only uses 2× downsampling as an example to explain the principle of the disclosure, it would be understood that a person skilled in the art may choose the ratio of the downsampling as appropriate. For example, 3×3 pixels, 1×2 pixels, 2×1 pixels, or any other at least two pixels may be determined in the adjusted first image feature, and at least two pixels in the adjusted first image feature are mapped to one pixel in the second image feature by using the method shown in FIG. 4A, to implement the downsampling process. Without departing from the principle of the disclosure, a person skilled in the art may arbitrarily determine the ratio of downsampling.

Referring back to FIG. 2, in operation S210, the first image feature and the second image feature may be combined to obtain a combined image feature.

In some embodiments, operation S210 may further include: determining a third weight adjustment parameter used for the adjusted first image feature, and performing weight adjustment on each channel in the adjusted first image feature by using the third weight adjustment parameter, to obtain the further adjusted first image feature, the third weight adjustment parameter including at least two parameter components, and each parameter component being used for adjusting a pixel of a channel corresponding to each parameter component. The weight adjustment method shown in FIG. 3A and FIG. 3B may be used to perform weight adjustment on the adjusted first image feature. Then, the further adjusted first image feature may be downsampled to obtain a third image feature having the second size. The second image feature and the third image feature are combined to obtain a fourth image feature having the second size. The weight adjustment method shown in FIG. 3A and FIG. 3B may be used to perform weight adjustment on the fourth image feature. For example, a fourth weight adjustment parameter used for the fourth image feature may be determined, and weight adjustment is performed on each channel in the fourth image feature by using the fourth weight adjustment parameter, to obtain an adjusted fourth image feature, the fourth weight adjustment parameter including at least two parameter components, and each parameter component being used for adjusting a pixel of a channel corresponding to each parameter component. Further, the adjusted fourth image feature may be downsampled to obtain a fifth image feature having a third size.

In this case, the first image feature, the second image feature, and the fifth image feature may be combined to obtain the combined image feature.

As can be seen, by using the result outputted in operation S208, image features of different scales representing the input image information may be determined. By combining the foregoing image features of different scales in various manners, different image processing effects may be achieved.

For example, the foregoing image features of different scales may be used to implement image segmentation processing on the input image, thereby dividing the image into several specific regions with different properties. For example, a medical image is used as an example, the image segmentation method may be used to distinguish regions of different properties in the input image (for example, normal regions and diseased regions).

In another example, the foregoing image features of different scales may be used to implement image classification processing on the input image. The image classification method may be used to determine whether the image belongs to a specific preset category.

In still another example, the foregoing image features of different scales may be used to implement object detection on a specific target in the input image. For example, the object detection method may be used to determine whether the image contains a specific target object and a position of the target object in the image.

In an image segmentation algorithm, the second image feature may be upsampled to obtain the upsampled second image feature. Then, the first image feature and the upsampled second image feature may be concatenated in a channel direction to obtain the combined image feature.

In an implementation, the process of upsampling the second image feature may include performing weight adjustment on the second image feature, and upsampling the adjusted second image feature. For example, the process shown in FIG. 3A and FIG. 3B may be used to determine a second weight adjustment parameter used for the second image feature, and perform weight adjustment on each channel in the second image feature by using the second weight adjustment parameter, to obtain an adjusted second image feature, the second weight adjustment parameter including at least two parameter components, and each parameter component being used for adjusting a pixel of a channel corresponding to each parameter component. Then, the adjusted second image feature may be upsampled to obtain the upsampled second image feature, the upsampled second image feature having the first size.

In some embodiments, for a third pixel in the adjusted second image feature, a second pixel vector corresponding to the third pixel is determined, the second pixel vector including elements of the third pixel in the at least two channels. Then, the second pixel vector may be mapped by using a full-rank second matrix to obtain the mapped second pixel vector. Further, the mapped second pixel vector may be rearranged to determine at least two fourth pixels in the upsampled second image feature.

Figure 4B:
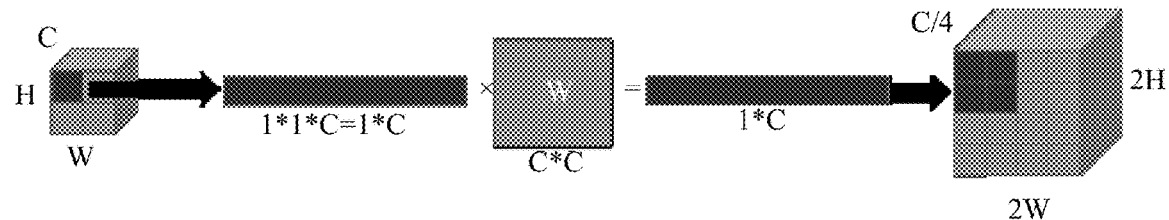
FIG. 4B shows an example process of upsampling according to an embodiment of the disclosure.

FIG. 4B shows an example process of upsampling according to an embodiment of the disclosure. In FIG. 4B, the principle of the disclosure is described by using an example in which the adjusted second image feature is a tensor with a size of H×W and a quantity of channels of C. H and W may be sizes with pixel quantities as units, and C is a positive integer.

As shown in FIG. 4B, a process of 2× upsampling is described by using a pixel in the adjusted second image feature as an example. For the pixel in the adjusted second image feature, values of elements of the pixel on the C channels may be determined. The C elements may be arranged into a one-dimensional vector with a size of 1×1×C, that is, a pixel vector of the pixel. Then, a second matrix with a size of C×C may be used to map the pixel vector of the pixel, to obtain a new mapped pixel vector with a size of 1×C. Then, by rearranging the mapped pixel vector with the size of 1×C, 2×2 pixels with an element of C/4 channels may be obtained, that is, 2×2 pixels in the image feature obtained after upsampling.

According to the process shown in FIG. 4B, after sequentially processing pixels in the adjusted second image feature, a tensor with a size of 2H×2W and a quantity of channels of C/4 may be obtained as an upsampled second image feature obtained by upsampling the adjusted second image feature.

As can be seen, the parameter matrix used in the upsampling process provided in the disclosure is a square matrix with a size of N×N (in the example of FIG. 4B, N=C), so that the mapping used in the upsampling process is a full-rank transformation, thereby transferring the image feature without loss of information. In the example shown in FIG. 4B, if a rank of the parameter matrix is less than 4C, loss of image information is caused in the mapping process. On the contrary, if the rank of the parameter matrix is greater than 4C, a quantity of parameters in the mapping process increases, but an amount of information in the image does not increase. Therefore, the full-rank matrix is used to implement the parameter transformation in the upsampling process, to transfer the image information with a small quantity of parameters without losing information.

Although FIG. 4B only uses 2× upsampling as an example to explain the principle of the disclosure, it would be understood that a person skilled in the art may choose the ratio of the upsampling as appropriate. For example, one pixel in the adjusted second image feature may be mapped to 3×3 pixels, 1×2 pixels, 2×1 pixels, or any other at least two pixels in the upsampled second image feature to implement the upsampling process. Without departing from the principle of the disclosure, a person skilled in the art may arbitrarily determine the ratio of upsampling.

In an image classification algorithm, the combined image feature may be determined through the following operations. In some embodiments, a third weight adjustment parameter used for the adjusted first image feature may be determined, and weight adjustment is performed on each channel in the adjusted first image feature by using the third weight adjustment parameter, to obtain the further adjusted first image feature, the third weight adjustment parameter including at least two parameter components, and each parameter component being used for adjusting a pixel of a channel corresponding to each parameter component. Then, the further adjusted first image feature may be downsampled to obtain a third image feature having the second size. Further, an addition operation may be performed on the second image feature and the third image feature to determine the combined image feature.

In an implementation, the weight adjustment process shown in FIG. 3A and FIG. 3B may be used to adjust the first image feature, and the process shown in FIG. 4A may be used to downsample the further adjusted first image feature. Details are not repeated herein.

In an object detection algorithm, the combined image feature may be determined through the following operations. In some embodiments, a third weight adjustment parameter used for the adjusted first image feature may be determined, and weight adjustment is performed on each channel in the adjusted first image feature by using the third weight adjustment parameter, to obtain the further adjusted first image feature, the third weight adjustment parameter including at least two parameter components, and each parameter component being used for adjusting a pixel of a channel corresponding to each parameter component. Then, the further adjusted first image feature may be downsampled to obtain a third image feature having the second size. Further, the second image feature and the third image feature may be concatenated in a channel direction to determine the combined image feature.

In an implementation, the weight adjustment process shown in FIG. 3A and FIG. 3B may be used to adjust the first image feature, and the process shown in FIG. 4A may be used to downsample the further adjusted first image feature. Details are not repeated herein.

Referring back to FIG. 2, in operation S212, an image processing result may be determined according to the combined image feature.

As described above, for different image processing methods, operation S210 may combine image features of image information with different scales in different manners. Therefore, by using the image feature outputted in operation S210, various image processing results may be obtained in different processing manners.

An example is used in which image segmentation is performed on the input image. Operation S212 may include performing convolution processing on the combined image feature to determine an image segmentation result used for the input image.

An example is used in which image classification is performed on the input image. Operation S212 may include performing convolution processing, global pooling, and full connection on the combined image feature to determine an image classification result used for the input image.

An example is used in which object detection is performed on the input image. Operation S212 may include performing convolution processing, full connection, and rearrangement on the combined image feature to determine an object detection result used for the input image.

By using the image processing method provided in the disclosure, the first weight adjustment parameter used for the first image feature is determined according to the elements in the at least two channels of the first image feature, and weight adjustment is performed on the at least two channels in the first image feature by using the first weight adjustment parameter to obtain an adjusted first image feature, so that finer channel features may be obtained, and a better image processing result may be further obtained. Further, by combining the first image feature and the second image feature of different sizes, picture information of different scales may be exchanged to obtain comprehensive image information, thereby obtaining a better image processing result. Furthermore, full-rank matrices are used to transform pixel information, to transfer the image information with a small quantity of parameters without losing information.

In the image processing method provided in FIG. 2, only the first size, the second size, and the third size are used as an example to explain the principle of the disclosure. However, it would be understood that a person skilled in the art may further downsample the image feature of the third size according to an actual condition, to obtain an image feature of a smaller size, and further combine image information of different scales to generate a final image processing result.

Figure 5A:
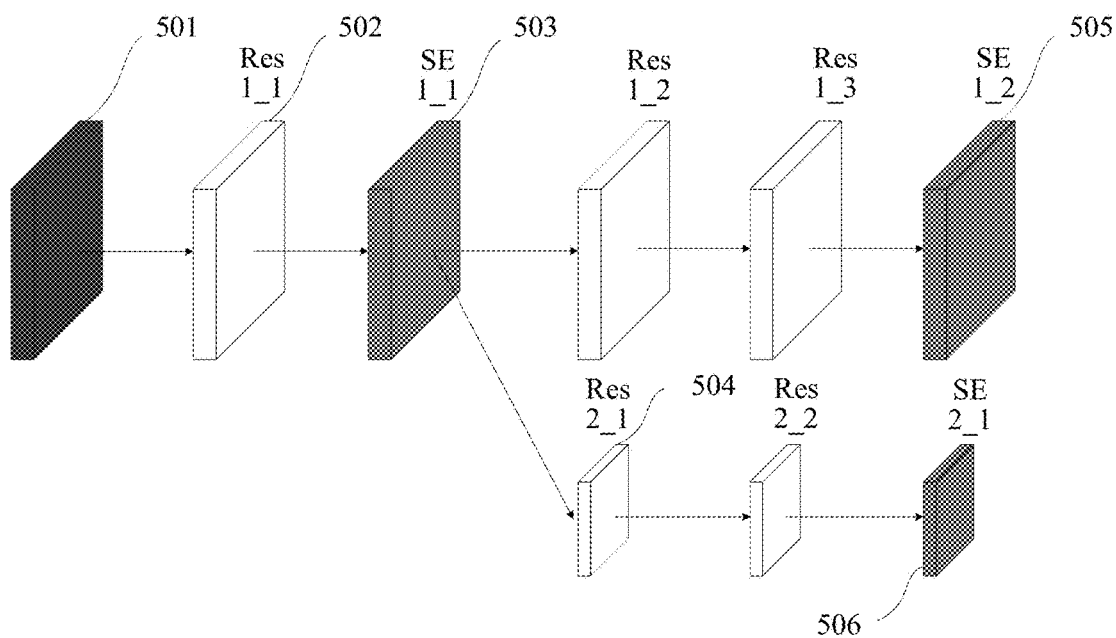
FIG. 5A shows an example process of an image processing process according to an embodiment of the disclosure.

FIG. 5A shows an example process of an image processing process according to an embodiment of the disclosure. By using a two-layer structure shown in FIG. 5A, information of image features of two different sizes may be fused for subsequent image processing.

In FIG. 5A, black color is used to indicate an input image 501, white color is used to indicate an image feature processed by a convolution processing module (for example, a Resnet module), gray color is used to indicate an image feature processed by weight adjustment, and a downward arrow indicates downsampling on the image features. For example, the methods shown in FIG. 3A and FIG. 3B may be used to perform weight adjustment on the image features. The method shown in FIG. 4A may be used to downsample the image features.

As shown in FIG. 5A, for the input image 501 of a first size, the input image 501 may be processed by using, for example, the Resnet module to obtain an image feature 502. Then, weight adjustment may be performed on the image feature 502 to obtain an image feature 503.

As shown in FIG. 5A, the image feature 503 may be downsampled by using, for example, the method shown in FIG. 4A to obtain an image feature 504 of a second size.

Then, at least one time of convolution processing and weight adjustment may be performed on each of the image feature 503 of the first size and the image feature 504 of the second size, to obtain an image feature 505 of the first size and an image feature 506 of the second size.

Therefore, by using the process shown in FIG. 5A, at least the image feature 505 of the first size and the image feature 506 of the second size may be outputted for a subsequent image processing process (for example, operation S210 and operation S212 described in FIG. 2).

Figure 5B:
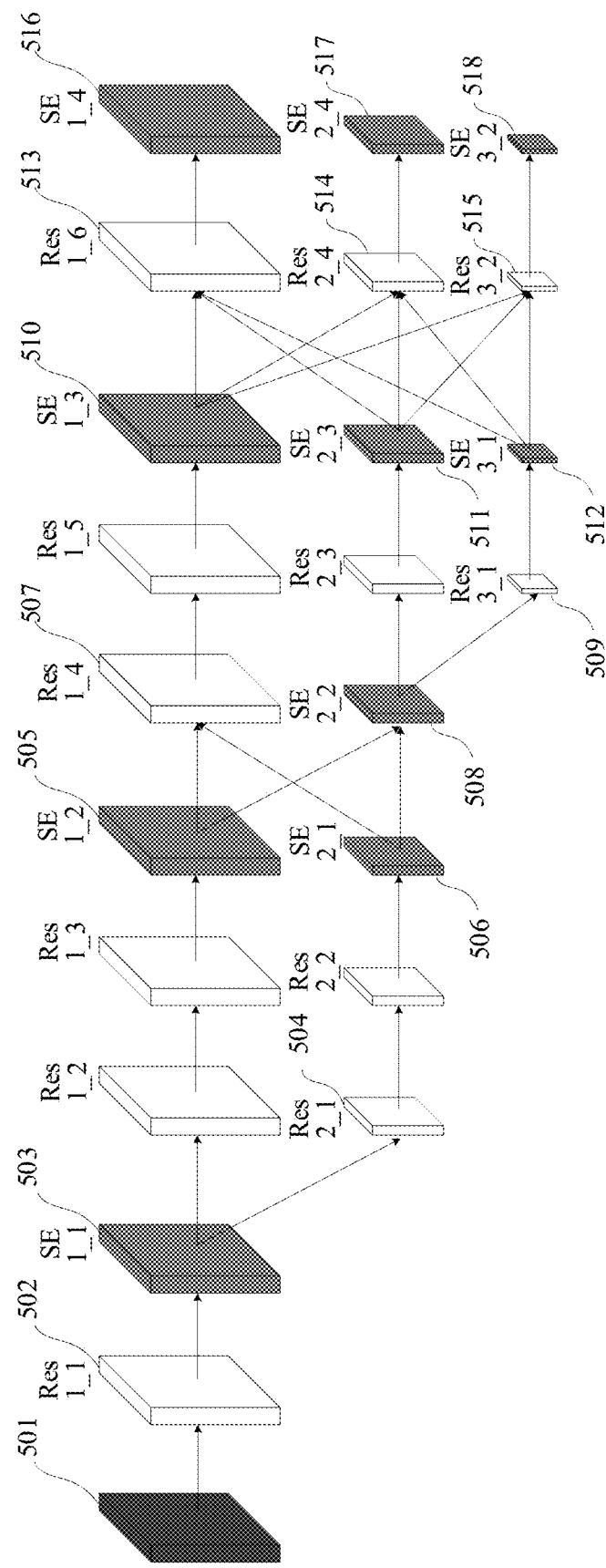
FIG. 5B shows another example process of an image processing process according to an embodiment of the disclosure.

FIG. 5B shows an exemplary process of an image processing process according to an embodiment of this application. By using a three-layer structure shown in FIG. 5B, information of image features of three different sizes may be fused for subsequent image processing.

In FIG. 5B, black color is used to indicate an input image 501, white color is used to indicate represents an image feature processed by a convolution processing module (for example, a Resnet module), gray color is used to indicate an image feature processed by weight adjustment, an upward arrow indicates upsampling on the image features, and a downward arrow indicates downsampling on the image features. For example, the methods shown in FIG. 3A and FIG. 3B may be used to perform weight adjustment on the image features. The method shown in FIG. 4A may be used to downsample the image features, and the method shown in FIG. 4B may be used to upsample the image features.

As shown in FIG. 5B, for the input image 501 of a first size, the input image 501 may be processed by using, for example, the Resnet module to obtain an image feature 502. Then, weight adjustment may be performed on the image feature 502 to obtain an image feature 503.

As shown in FIG. 5B, the image feature 503 may be downsampled by using, for example, the method shown in FIG. 4A to obtain an image feature 504 of a second size.

Then, at least one time of convolution processing and weight adjustment may be performed on each of the image feature 503 of the first size and the image feature 504 of the second size, to obtain an image feature 505 of the first size and an image feature 506 of the second size.

Further, the image feature 506 of the second size may be upsampled, and the upsampled image feature 506 of the first size and the image feature 505 of the first size may be added to obtain an image feature 507 of the first size. In addition, downsampling and weight adjustment may be performed on the image feature 505 of the first size, and the downsampled image feature 505 and the image feature 506 may be added to obtain an image feature 508 of the second size.

Further, the image feature 508 of the second size obtained after the weight adjustment may be downsampled to obtain an image feature 509 of a third size.

Then, at least one time of convolution processing and weight adjustment may be performed on the image feature 507 of the first size, the image feature 508 of the second size, and the image feature 509 of the third size, to obtain an image feature 510 of the first size, an image feature 511 of the second size, and an image feature 512 of the third size.

Then, the image feature 510 of the first size, the image feature 511 of the second size after one time of upsampling, and the image feature 512 of the third size after two times of upsampling may be added to obtain an image feature 513 of the first size. The image feature 510 of the first size after one time of downsampling, the image feature 511 of the second size, and the image feature 512 of the third size after one time of upsampling may be added to obtain an image feature 514 of the second size. The image feature 510 of the first size after two times of downsampling, the image feature 511 of the second size after one time of downsampling, and the image feature 512 of the third size may be added to obtain an image feature 515 of the third size.

Then, at least one time of convolution processing and weight adjustment may be performed on the image feature 513 of the first size, the image feature 514 of the second size, and the image feature 515 of the third size, to respectively obtain an output image feature 516 of the first size, an output image feature 517 of the second size, and an output image feature 518 of the third size.

Therefore, by using the process shown in FIG. 5B, at least the image feature 516 of the first size, the image feature 517 of the second size, and the image feature 518 of the third size may be outputted for a subsequent image processing process (for example, operation S210 and operation S212 described in FIG. 2).

An example of a quantity of channels of each module in a neural network shown in FIG. 5B is given in Table 1. It would be understood that, without departing from the principles disclosed in the disclosure, a person skilled in the art may adjust, according to a condition, a quantity of channels used by each module.

TABLE 1

| Module number | Quantity of channels |
| --- | --- |
| Res1_1 | 16 |
| SE1_1 | 16 |
| Res1_2 | 16 |
| Res2_1 | 64 |
| Res1_3 | 32 |
| Res2_2 | 128 |
| SE1_2 | 32 |
| SE2_1 | 128 |
| Res1_4 | 32 |
| SE2_2 | 128 |
| Res1_5 | 32 |
| Res2_3 | 128 |
| Res3_1 | 512 |
| SE1_3 | 64 |
| SE2_3 | 256 |
| SE3_1 | 1024 |
| Res1_6 | 64 |
| Res2_4 | 256 |
| Res3_2 | 1024 |
| SE1_4 | 64 |
| SE2_4 | 256 |
| SE3_2 | 1024 |

Figure 6A:
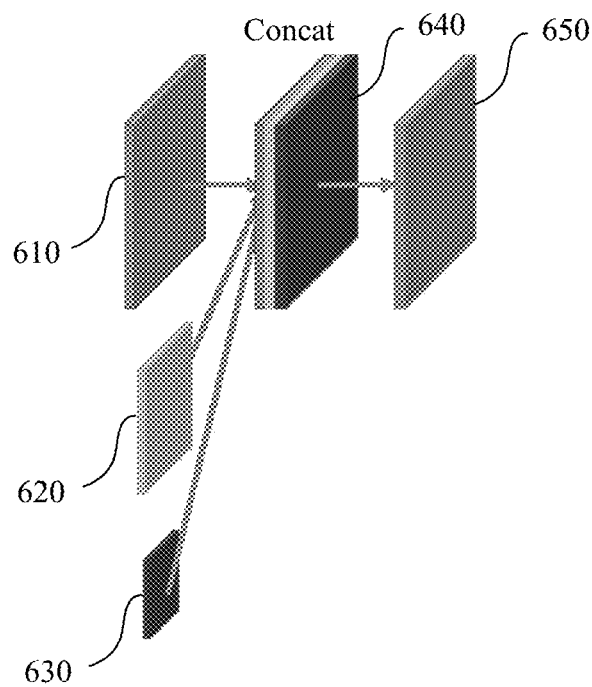
FIG. 6A shows an example method for determining an image segmentation result according to an embodiment of the disclosure.

FIG. 6A shows an example method for determining an image segmentation result according to an embodiment of the disclosure.

As shown in FIG. 6A, an output image feature 610 of the first size, an output image feature 620 of the second size, and an output image feature 630 of the third size may be obtained by using the network structure shown in FIG. 5B.

The output image feature 620 of the second size may be upsampled to obtain the upsampled output image feature 620 of the first size, and the output image feature 630 of the third size may be upsampled to obtain the upsampled output image feature 630 of the first size. Then, the output image feature 610 of the first size, the upsampled output image feature 620, and the upsampled output image feature 630 may be concatenated in a channel direction to obtain a combined image feature 640. Further, a convolution layer may be used to perform convolution processing on the combined image feature 640, and the combined image feature after the convolution processing may be further processed by a sigmoid layer to obtain a final image segmentation result.

Table 2 shows quantities of channels of modules of a neural network used during image segmentation processing to determine the segmentation result. The image feature 610 of the first size has 64 channels. The image feature 620 of the second size has 256 channels. The image feature 620 is upsampled to the first size by using the process shown in FIG. 4B, so that the upsampled image feature 620 has 256/4=64 channels. Similarly, the image feature 630 of the third size is upsampled to the first size, so that the upsampled image feature 630 also has 256/4=64 channels. Therefore, a concatenating layer has 64+64+64=192 channels.

TABLE 2

| Module number | Quantity of channels |
| --- | --- |
| SE1_4 | 64 |
| SE2_4 | 256 |
| SE3_2 | 1024 |
| Concat | 192 |

In some embodiments, an output image during image segmentation processing has the same size as that of an input image, and a pixel value of each pixel in the output image represents a probability that the pixel belongs to a predetermined region. In an implementation, the probability that the pixel belongs to the predetermined region may be represented as a probability between 0 and 1. When the probability that the pixel belongs to the predetermined region is greater than a preset threshold (for example, 0.5), it may be considered that the pixel belongs to the predetermined region. Correspondingly, when the probability that the pixel belongs to the predetermined region is less than a preset threshold (for example, 0.5), it may be considered that the pixel does not belong to the predetermined region.

In some embodiments, during the image segmentation processing, an Adam-based gradient descent method may be used to update parameters of a network provided in the disclosure. An initial learning rate may be preset to 0.05, and a betas parameter in Adam may be preset to (0.95, 0.9995). A training image in a preset training set may be processed by using the network provided in the disclosure to obtain a training image segmentation result, and a result of processing the training image may be used to determine a loss function of an image segmentation processing task.

In an implementation, a dice index may be used as the loss function of the image segmentation processing task. The dice index may be used to indicate an overlapping degree between an image segmentation result obtained through processing of the neural network and a real image segmentation result. The real image segmentation result may be obtained by manually segmenting a training image in the training set. In some embodiments, the following formula may be used to calculate the dice index:

$$Dice = 2\frac{V_{seg} \cap V_{gt}}{V_{seg} + V_{gt}}$$

where $V_{seg}$ represents the image segmentation result obtained through processing of the neural network, and $V_{gt}$ represents the real image segmentation result.

By minimizing the loss function, an error gradient may be calculated, and a gradient of the network may be updated through backward propagation to complete the training of the neural network.

Figure 6B:
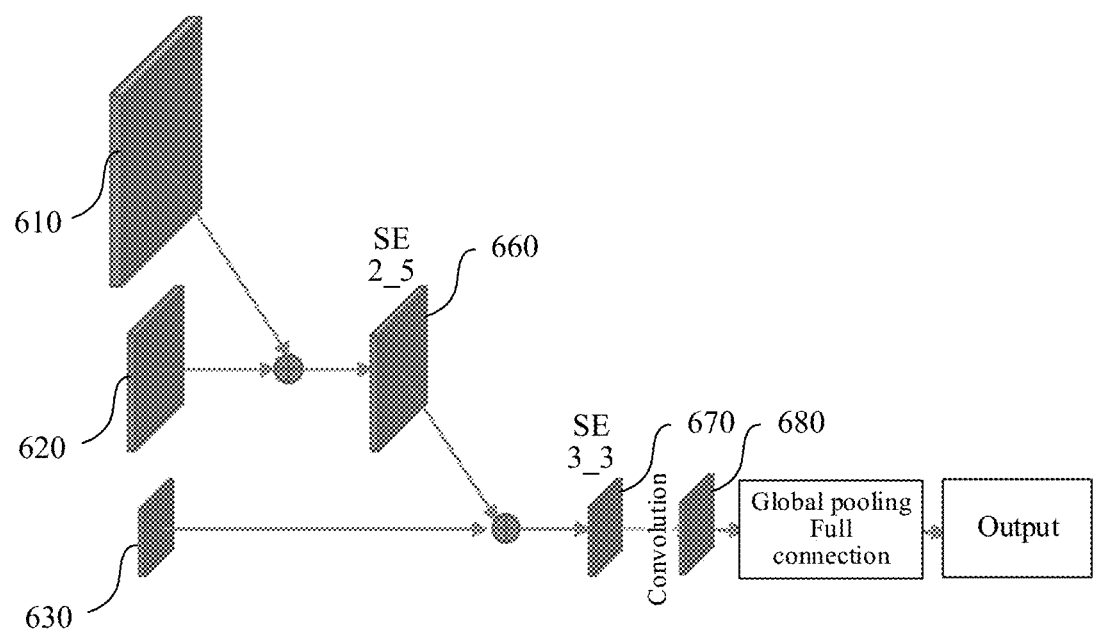
FIG. 6B shows an example method for determining an image classification result according to an embodiment of the disclosure.

FIG. 6B shows an example method for determining an image classification result according to an embodiment of the disclosure.

As shown in FIG. 6B, an output image feature 610 of the first size, an output image feature 620 of the second size, and an output image feature 630 of the third size may be obtained by using the network structure shown in FIG. 5B.

In some embodiments, the output image feature 610 of the first size may be downsampled to obtain the downsampled output image feature 610 of the second size. Then, the output image feature 620 of the second size and the downsampled output image feature 610 may be added to obtain an image feature 660. For example, pixel values of corresponding pixels in the output image feature 620 of the second size and the downsampled output image feature 610 may be added to obtain the image feature 660 in which image information of the output image feature 610 and that of the output image feature 620 are fused. Further, the image feature 660 may be downsampled to obtain the downsampled image feature 660 of the third size. Then, the output image feature 630 of the third size and the downsampled image feature 660 may be added to obtain a combined image feature 670. Further, convolution processing may be performed on the combined image feature 670 to obtain an image feature 680, and the image feature 680 is further processed by using a global pooling layer and a fully connected layer, to obtain a final image classification result.

In some embodiments, the image classification result may be preset as a vector of 1×K, where K represents a preset quantity of categories. A value of each element in the image classification result represents a probability that the image belongs to a corresponding category.

Table 3 shows quantities of channels of modules of a neural network used during image classification processing to determine the classification result.

TABLE 3

| Module number | Quantity of channels |
|---|---|
| SE1_4 | 64 |
| SE2_4 | 256 |
| SE3_2 | 1024 |
| SE2_5 | 256 |
| SE3_3 | 1024 |
| Convolution layer | 4096 |
| Pooling layer + fully connected layer | K |

In some embodiments, during the image classification processing, an Adam-based gradient descent method may be used to update parameters of a network provided in the disclosure. An initial learning rate may be preset to 0.05, and a betas parameter in Adam may be preset to (0.95, 0.9995). A training image in a preset training set may be processed by using the network provided in the disclosure to obtain a training image classification result, and a result of processing the training image may be used to determine a loss function of an image classification processing task.

In an implementation, a weighted cross entropy function may be used as the loss function of the image classification processing task. By minimizing the loss function, an error gradient may be calculated, and a gradient of the network may be updated through backward propagation to complete the training of the neural network.

Figure 6C:
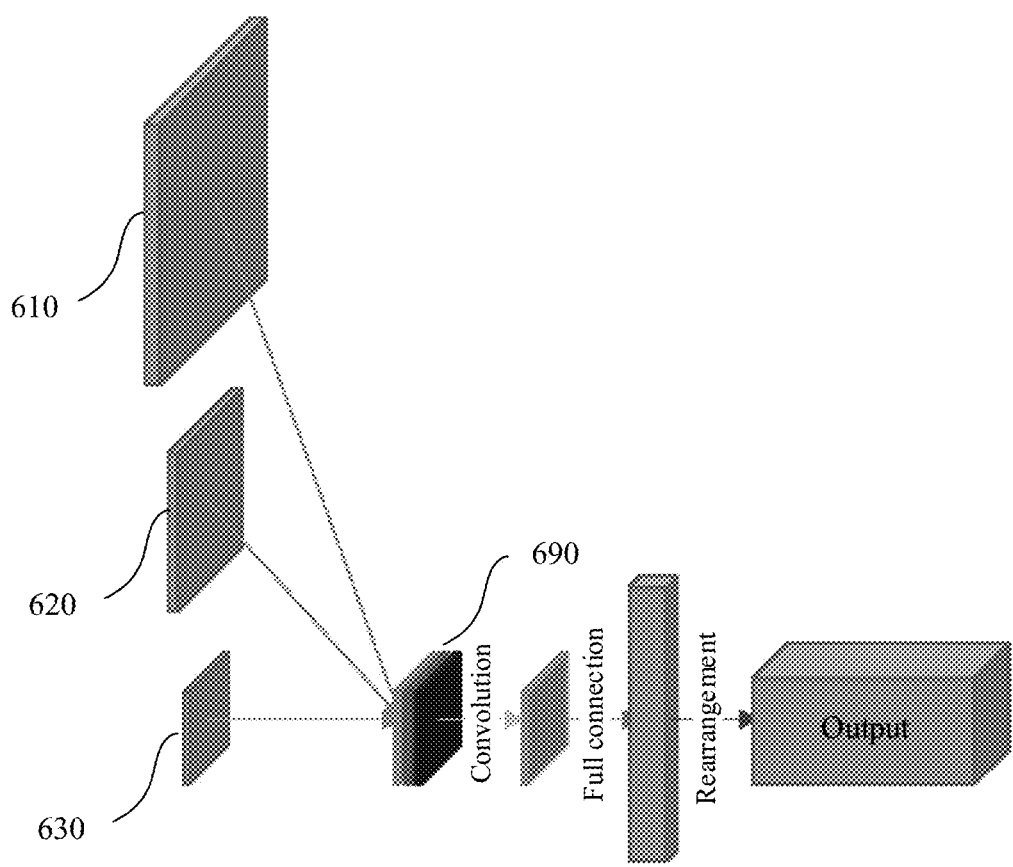
FIG. 6C shows an example method for determining an object detection result according to an embodiment of the disclosure.

FIG. 6C shows an example method for determining an object detection result according to an embodiment of the disclosure.

As shown in FIG. 6C, an output image feature 610 of the first size, an output image feature 620 of the second size, and an output image feature 630 of the third size may be obtained by using the network structure shown in FIG. 5B. The output image feature 610 of the first size may be downsampled to obtain the downsampled output image feature 610 of the third size, and the output image feature 620 of the second size may be downsampled to obtain the downsampled output image feature 620 of the third size. Then, the downsampled output image feature 610 of the third size, the downsampled output image feature 620, and the output image feature 630 may be concatenated in a channel direction to obtain a combined image feature 690. Further, an output of an object detection result may be obtained by performing convolution processing, processing of the fully connected layer, and rearrangement on the combined image feature 690.

In some embodiments, the output of the object detection result may be represented as a position and a size of a detection frame in an output image and a category of an object included in the detection frame.

Table 4 shows quantities of channels of modules of a neural network used during object detection processing on the image to determine the detection result.

TABLE 4

| Module number | Quantity of channels |
|---|---|
| SE1_4 | 64 |
| SE2_4 | 256 |
| SE3_2 | 1024 |
| Convolution layer | 4096 |
| Pooling layer + fully connected layer | S × S × (B × 5 × C) | where B is a quantity of detection frames, C is a quantity of detection categories, and S is a quantity of detection intervals in this detection task.

The training image in the training data set is processed by using the neural network provided in the disclosure to obtain the training object detection result, and the real object detection result of the training image may be obtained by using manual annotation. The parameter adjustment on the neural network may be completed by obtaining, through comparison, a loss between the training object detection result and the real object detection result. In some embodiments, a mean square error may be used to represent a loss of the detection region, and the cross entropy function may represent a loss of a classification result of an object included in the detection region.

Figure 7:
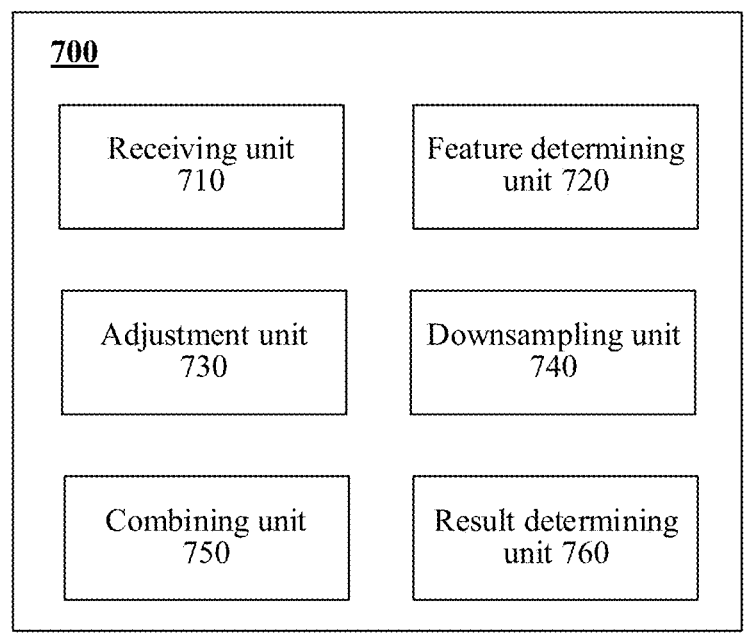
FIG. 7 is a schematic block diagram of an image processing apparatus according to an embodiment of the disclosure.

FIG. 7 is a schematic block diagram of an image processing apparatus according to an embodiment of the disclosure. As shown in FIG. 7, an image processing apparatus 700 may include a receiving unit 710, a feature determining unit 720, an adjustment unit 730, a downsampling unit 740, a combining unit 750, and a result determining unit 760.

The receiving unit 710 may be configured to receive an input image. In some embodiments, an image capture device may be used to capture the input image. In some other embodiments, the input image may be alternatively read from a storage device that stores pictures.

The input image described herein may contain various image information. For example, the input image may be an image and/or video in a driving process acquired by an in-vehicle image capture device. In another example, the input image may be a surveillance image and/or surveillance video acquired by a monitoring device. In still another example, the input image may be an image generated by a medical instrument by using CT, Mill, ultrasound, X-ray, electrocardiogram, electroencephalogram, optical photography, or the like.

In some embodiments, the input image may be black and white, or color. For example, when the input image is a black and white image, the input image may have a single channel. In another example, when the input image is a color image, the input image may have at least two channels (such as R, G, and B).

The feature determining unit 720 may be configured to determine a first image feature of a first size of the input image, the first image feature having at least two channels.

The first image feature may have the same size as that of the input image, or may have a size different from that of the input image.

In some embodiments, the first image feature may be determined by performing convolution processing on the input image. A specific form of performing convolution processing on the input image is not limited in the disclosure herein. For example, modules of a VGG series network, a Resnet series network and/or an Inception series network may be used to perform convolution processing on the input image at least once to obtain the first image feature. In the disclosure, a Resnet module is used as an example to explain the principle of the disclosure. However, it would be understood that any one of the foregoing network modules or any other network module capable of extracting image features may be used to replace the Resnet module in the disclosure.

The adjustment unit 730 may be configured to determine a first weight adjustment parameter to be used for the first image feature, and perform weight adjustment on each channel in the first image feature by using the first weight adjustment parameter, to obtain an adjusted first image feature, the first weight adjustment parameter including at least two parameter components, and each parameter component being used for adjusting a pixel of a channel corresponding to each parameter component. For example, the methods shown in FIG. 3A and FIG. 3B may be used to perform weight adjustment on the image features.

The downsampling unit 740 may be configured to downsample the adjusted first image feature to obtain a second image feature having a second size, the second size being smaller than the first size. The second image feature has at least two channels, and a quantity of channels of the second image feature is greater than a quantity of channels of the first image feature.

For example, the downsampling unit 740 may downsample the adjusted first image feature by using the method shown in FIG. 4A.

The combining unit 750 may be configured to combine the first image feature and the second image feature to obtain a combined image feature.

In some embodiments, the adjustment unit 730 is further configured to determine, for each channel in the at least two channels in the first image feature, a global feature parameter of each channel; and determine, by using the global feature parameter of each channel, a parameter component used for adjusting a pixel of each channel in the at least two channels.

In some embodiments, the downsampling unit 740 is further configured to determine, for M×N first pixels in the adjusted first image feature, a first pixel vector corresponding to the M×N first pixels, the first pixel vector including elements of the M×N first pixels in the at least two channels, M and N being positive integers, and a product of M and N being a positive integer greater than 1; map the first pixel vector by using a full-rank first matrix to obtain the mapped first pixel vector; and determine a second pixel in the second image feature according to the mapped first pixel vector.

In some embodiments, the combining unit 750 is further configured to upsample the second image feature to obtain the upsampled second image feature; and concatenate the first image feature and the upsampled second image feature in a channel direction to obtain the combined image feature.

In some embodiments, the combining unit 750 is further configured to determine a second weight adjustment parameter to be used for the second image feature, and perform weight adjustment on each channel in the second image feature by using the second weight adjustment parameter, to obtain an adjusted second image feature, the second weight adjustment parameter including at least two parameter components, and each parameter component being used for adjusting a pixel of a channel corresponding to each parameter component; and upsample the adjusted second image feature to obtain the upsampled second image feature, the upsampled second image feature having the first size.

In some embodiments, the combining unit 750 is further configured to determine, for a third pixel in the adjusted second image feature, a second pixel vector corresponding to the third pixel, the second pixel vector including elements of the third pixel in the at least two channels; map the second pixel vector by using a full-rank second matrix to obtain the mapped second pixel vector; and rearrange the mapped second pixel vector to determine at least two fourth pixels in the upsampled second image feature.

In some embodiments, the combining unit 750 may be further configured to determine a third weight adjustment parameter to be used for the adjusted first image feature, and perform weight adjustment on each channel in the adjusted first image feature by using the third weight adjustment parameter, to obtain the further adjusted first image feature, the third weight adjustment parameter including at least two parameter components, and each parameter component being used for adjusting a pixel of a channel corresponding to each parameter component. The weight adjustment method shown in FIG. 3A and FIG. 3B may be used to perform weight adjustment on the adjusted first image feature. Then, the further adjusted first image feature may be downsampled to obtain a third image feature having the second size. The second image feature and the third image feature are combined to obtain a fourth image feature having the second size. The weight adjustment method shown in FIG. 3A and FIG. 3B may be used to perform weight adjustment on the fourth image feature. For example, a fourth weight adjustment parameter to be used for the fourth image feature may be determined, and weight adjustment is performed on each channel in the fourth image feature by using the fourth weight adjustment parameter, to obtain an adjusted fourth image feature, the fourth weight adjustment parameter including at least two parameter components, and each parameter component being used for adjusting a pixel of a channel corresponding to each parameter component. Further, the adjusted fourth image feature may be downsampled to obtain a fifth image feature having a third size. In this case, the first image feature, the second image feature, and the fifth image feature may be combined to obtain the combined image feature.

An image segmentation algorithm is used as an example. In some embodiments, the second image feature may be upsampled to obtain the upsampled second image feature. Then, the first image feature and the upsampled second image feature may be concatenated in a channel direction to obtain the combined image feature.

In an implementation, the process of upsampling the second image feature may include performing weight adjustment on the second image feature, and upsampling the adjusted second image feature. For example, the processes shown in FIG. 3A and FIG. 3B may be used to determine the second weight adjustment parameter to be used for the second image feature, and the process shown in FIG. 4B may be used to upsample the adjusted second image feature.

An image classification algorithm is used as an example, and the combined image feature may be determined through the following operations. In some embodiments, a third weight adjustment parameter to be used for the adjusted first image feature may be determined, and weight adjustment is performed on each channel in the adjusted first image feature by using the third weight adjustment parameter, to obtain the further adjusted first image feature, the third weight adjustment parameter including at least two parameter components, and each parameter component being used for adjusting a pixel of a channel corresponding to each parameter component. Then, the further adjusted first image feature may be downsampled to obtain a third image feature having the second size. Further, an addition operation may be performed on the second image feature and the third image feature to determine the combined image feature.

In an implementation, the weight adjustment process shown in FIG. 3A and FIG. 3B may be used to adjust the first image feature, and the process shown in FIG. 4A may be used to downsample the further adjusted first image feature. Details are not repeated herein.

An example is used in which object detection is performed on the image, and the combined image feature may be determined through the following operations. In some embodiments, a third weight adjustment parameter to be used for the adjusted first image feature may be determined, and weight adjustment is performed on each channel in the adjusted first image feature by using the third weight adjustment parameter, to obtain the further adjusted first image feature, the third weight adjustment parameter including third adjustment parameter components respectively used for adjusting each channel in the adjusted first image feature. Then, the further adjusted first image feature may be downsampled to obtain a third image feature having the second size. Further, the second image feature and the third image feature may be concatenated in a channel direction to determine the combined image feature.

In an implementation, the weight adjustment process shown in FIG. 3A and FIG. 3B may be used to adjust the first image feature, and the process shown in FIG. 4A may be used to downsample the further adjusted first image feature. Details are not repeated herein.

The result determining unit 760 may be configured to determine an image processing result according to the combined image feature.

As described above, for different image processing methods, the combining unit 750 may combine image features of image information with different scales in different manners. Therefore, by using the image feature outputted by the combining unit 750, various image processing results may be obtained in different processing manners.

In an example embodiment, image segmentation is performed on the input image. The result determining unit 760 may be configured to perform convolution processing on the combined image feature to determine an image segmentation result used for the input image.

In an example embodiment, image classification is performed on the input image. The result determining unit 760 may be configured to perform convolution processing, global pooling, and full connection on the combined image feature to determine an image classification result used for the input image.

In an example embodiment, object detection is performed on the input image. The result determining unit 760 may be configured to perform convolution processing, full connection, and rearrangement on the combined image feature to determine an object detection result used for the input image.

By using the image processing apparatus provided in the disclosure, the first weight adjustment parameter to be used for the first image feature is determined according to the elements in the at least two channels of the first image feature, and weight adjustment is performed on the at least two channels in the first image feature by using the first weight adjustment parameter to obtain an adjusted first image feature, so that finer channel features may be obtained, and a better image processing result may be further obtained. Further, by combining the first image feature and the second image feature of different sizes, picture information of different scales may be exchanged to obtain comprehensive image information, thereby obtaining a better image processing result. Furthermore, full-rank matrices are used to transform pixel information, to transfer the image information with a small quantity of parameters without losing information.

Figure 8:
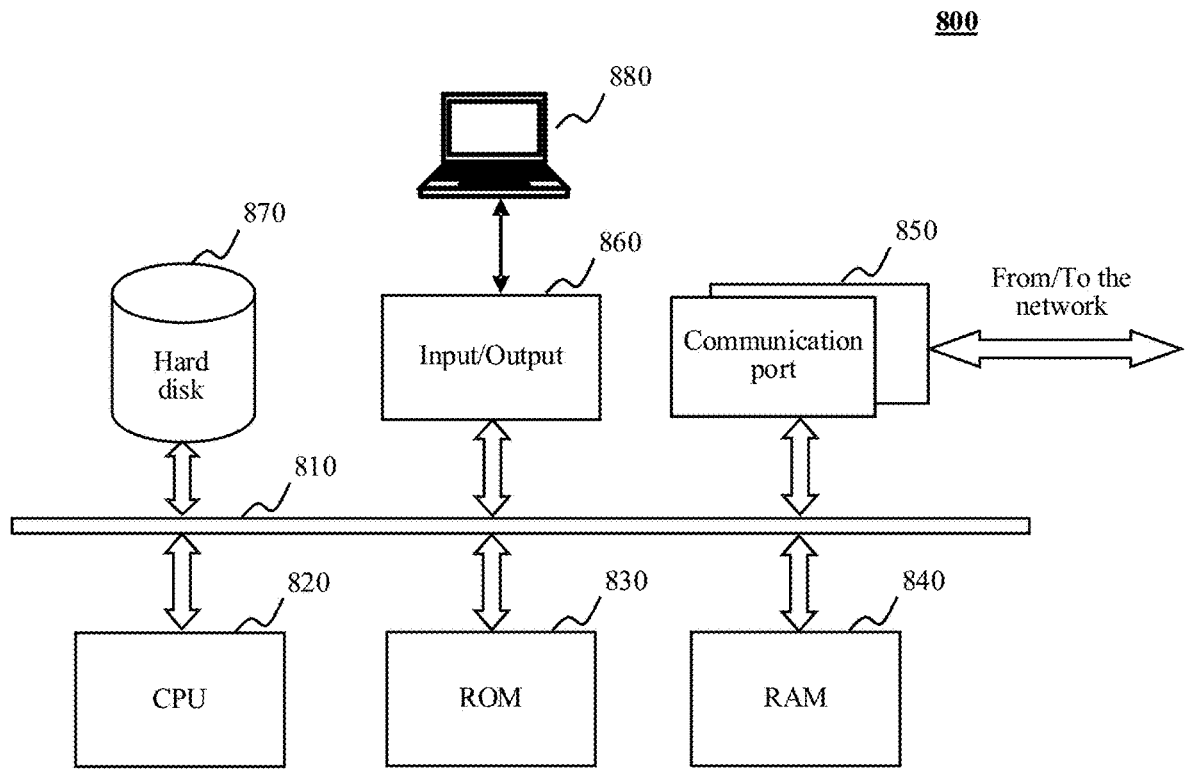
FIG. 8 shows an architecture of a computing device according to an embodiment of the disclosure.

In addition, the method or apparatus according to the embodiments of the disclosure may alternatively be implemented by using an architecture of a computing device shown in FIG. 8. FIG. 8 shows an architecture of the computing device. As shown in FIG. 8, the computing device 800 may include a bus 810, one or at least two CPUs 820, a read-only memory (ROM) 830, a random access memory (RAM) 840, a communication port 850 connected to a network, an input/output component 860, a hard disk 870, and the like. A storage device, for example, the ROM 830 or the hard disk 870, in the computing device 800 may store various data or files used in processing and/or communication in the method for detecting a target in a video provided in the disclosure and program instructions executed by the CPU. The computing device 800 may further include a user interface 880. The architecture shown in FIG. 8 is only an example, and in other embodiments, one or at least two components in the computing device shown in FIG. 8 may be omitted or additional components not shown in FIG. 8 may be added.

Figure 9:
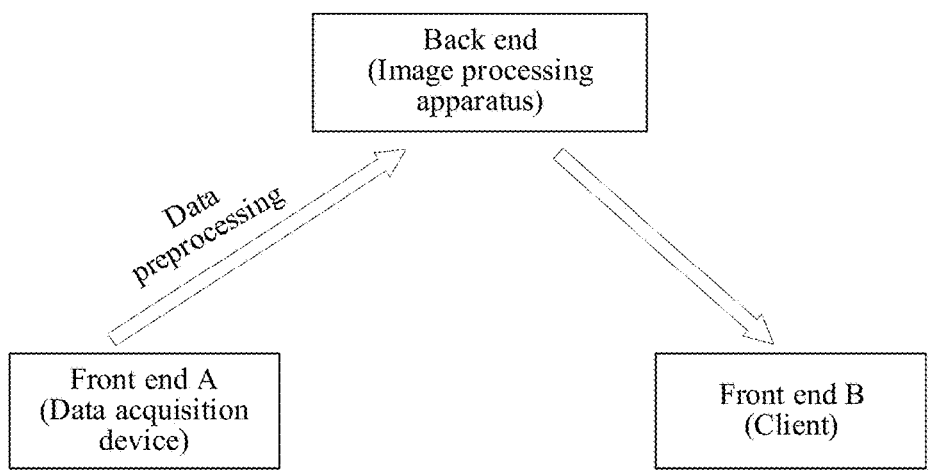
FIG. 9 shows a schematic use scenario according to an embodiment of the disclosure.

FIG. 9 shows a schematic use scenario according to an embodiment of the disclosure.

In some embodiments, the method and apparatus provided in the disclosure may be used for image processing of a medical image. The medical image described herein may be, for example, a medical image captured through a method such as CT, MRI, ultrasound, X-ray, or nuclide imaging (for example, SPECT or PET), or may be an image displaying physiological information of a human body, for example, an electrocardiogram, an electroencephalogram, or an optical photograph. The foregoing medical images are important means and reference factors for assisting in clinical diagnosis. According to an appearance and a shape embodied in a medical image, the inherent heterogeneity of different diseases may be further reflected. By performing image segmentation processing on a medical image, a position of a lesion in the image may be obtained through segmentation. By performing image classification processing on a medical image, a category of a lesion in the image may be determined. For example, diseases such as tumors, tuberculosis, cysts, and cardiovascular diseases may be diagnosed according to a medical image.

As shown in FIG. 9, a front end A may be used to receive medical image data to be processed by a user. For example, the front end A may use various medical imaging devices (such as a CT, MRI, ultrasound, and X-ray instrument) that acquire medical image data. Further, the front end A may be used to preprocess the image data to be processed, including but not limited to data augmentation such as translation, rotation, and symmetrization, and organ selection algorithms such as segmentation. It would be understood that the front end A may alternatively send the acquired image data to another electronic device for preprocessing the image data.

In some embodiments, the preprocessed medical image data may be sent to a back end by using the front end A or another electronic device that preprocesses the image. The back end herein may be implemented as an image processing apparatus provided in the disclosure. By using the back-end image processing apparatus, image segmentation, image classification, and/or object detection processing of medical images may be implemented. Then, the image processing apparatus may send a result of segmentation, classification, or object detection to a front end B.

The front end B described herein may be the same as or different from the front end A. In some embodiments, the front end B may include an output device. For example, the output device may be a display screen or a speaker, so that a processing result of the image processing apparatus may be outputted in a visual or auditory manner. It would be understood that the output device may alternatively be any other type of device.

In some examples, when a data acquisition device includes a display screen, the back-end image processing apparatus may send the image processing result back to the front end A to display the image processing result to the user. In some other examples, the front end B may be an electronic device (such as a mobile phone, or a computer) as a client. The client may include an output device to display the image processing result to the user. In addition, the client may further include a processing unit, and may perform further subsequent processing on a result outputted by the image processing apparatus.

The embodiments of the disclosure may alternatively be implemented as a computer-readable storage medium. The computer-readable storage medium according to the embodiments of the disclosure stores a computer-readable instruction. The computer-readable instruction, when executed by a processor, may perform the method according to the embodiments of the disclosure described with reference to the foregoing accompanying drawings. The computer-readable storage medium includes, but is not limited to, a volatile memory and/or a non-volatile memory. For example, the volatile memory may include a RAM and/or a high-speed cache. For example, the non-volatile memory may include a ROM, a hard disk, and a flash memory.

By using the image processing method, apparatus, and device, the storage medium, and any related technology provided in the disclosure, the first weight adjustment parameter to be used for the first image feature is determined according to the elements in the at least two channels of the first image feature, and weight adjustment is performed on the at least two channels in the first image feature by using the first weight adjustment parameter to obtain an adjusted first image feature, so that finer channel features may be obtained, and a better image processing result may be further obtained. Further, by combining the first image feature and the second image feature of different sizes, picture information of different scales may be exchanged to obtain comprehensive image information, thereby obtaining a better image processing result. Furthermore, full-rank matrices are used to transform pixel information, to transfer the image information with a small quantity of parameters without losing information.

A person skilled in the art would understand that, content disclosed in the disclosure may have various variations and improvements. For example, the devices or components described above may be implemented by using hardware, or may be implemented by using software, firmware, or a combination of some of or all of the software, the firmware, and the hardware.

In addition, as shown in the disclosure and the claims, words such as "a/an", "one", "one kind", and/or "the" do not refer specifically to singular forms and may also include plural forms, unless the context expressly indicates an exception. In general, terms "comprise" and "include" merely indicate including clearly identified operations and elements. The operations and elements do not constitute an exclusive list. A method or a device may also include other operations or elements.

In addition, although the disclosure makes various references to some units in the system according to the embodiments of the disclosure, any quantity of different units may be used and run on a client and/or a server. The units are only illustrative, and different aspects of the system and method may use different units.

In addition, flowcharts are used in the disclosure for illustrating operations performed by the system according to the embodiments of the disclosure. It is to be understood that, the foregoing or following operations are not necessarily strictly performed according to an order. On the contrary, the operations may be performed in a reverse order or simultaneously or any other given order. Meanwhile, other operations may be added to the processes. Alternatively, one or more operations may be deleted from the processes.

Unless otherwise defined, all terms (including technical and scientific terms) used herein have the same meaning as commonly understood by one of ordinary skill in the art to which the disclosure belongs. It is further to be understood that, the terms such as those defined in commonly used dictionaries are to be interpreted as having meanings that are consistent with the meanings in the context of the related art, and are not to be interpreted in an idealized or extremely formalized sense, unless expressively so defined herein.

The above is description of the disclosure, and is not to be considered as a limitation to the disclosure. Although several example embodiments of the disclosure are described, a person skilled in the art would easily understand that, various changes may be made to the example embodiments without departing from novel teaching and advantages of the disclosure. Therefore, the changes are intended to be included within the scope of the disclosure as defined by the claims. It is to be understood that, the above is description of the disclosure, and is not to be considered to be limited by the disclosed specific embodiments, and modifications to the disclosed embodiments and other embodiments fall within the scope of the appended claims and their equivalents.

What is claimed is:

1. An image processing method, performed by a computing device, the method comprising:
   determining a first image feature of a first size of an input image, the first image feature having at least two channels;
   determining a first weight adjustment parameter corresponding to the first image feature, and performing weight adjustment on each channel in the first image feature by using the first weight adjustment parameter, to obtain an adjusted first image feature, the first weight adjustment parameter comprising at least two first parameter components, and each first parameter component being used for adjusting a pixel of a channel corresponding to each first parameter component;
   downsampling the adjusted first image feature to obtain a second image feature having a second size, the second size being smaller than the first size;
   combining the first image feature and the second image feature to obtain a combined image feature; and
   determining an image processing result according to the combined image feature.

2. The image processing method according to claim 1, wherein the determining the first weight adjustment parameter comprises:
   determining, for each channel in the at least two channels in the first image feature, a global feature parameter of each channel; and
   determining, by using the global feature parameter of each channel, a first parameter component used for adjusting a pixel of each channel in the at least two channels.

3. The image processing method according to claim 1, wherein the downsampling the adjusted first image feature to obtain the second image feature comprises:
   determining, for M×N first pixels in the adjusted first image feature, a first pixel vector corresponding to the M×N first pixels, the first pixel vector comprising elements of the M×N first pixels in the at least two channels, M and N being positive integers, and a product of M and N being a positive integer greater than 1;
   mapping the first pixel vector by using a full-rank first matrix to obtain the mapped first pixel vector; and
   determining a second pixel in the second image feature according to the mapped first pixel vector.

4. The image processing method according to claim 1, wherein the combining the first image feature and the second image feature to obtain the combined image feature comprises:
   upsampling the second image feature to obtain the upsampled second image feature; and
   concatenating the first image feature and the upsampled second image feature in a channel direction to obtain the combined image feature.

5. The image processing method according to claim 4, wherein the upsampling the second image feature to obtain the upsampled second image feature comprises:
   determining a second weight adjustment parameter corresponding to the second image feature, and performing weight adjustment on each channel in the second image feature by using the second weight adjustment parameter, to obtain an adjusted second image feature, the second weight adjustment parameter comprising at least two second parameter components, and each second parameter component being used for adjusting a pixel of a channel corresponding to each second parameter component; and
   upsampling the adjusted second image feature to obtain the upsampled second image feature, the upsampled second image feature having the first size.

6. The image processing method according to claim 5, wherein the upsampling the adjusted second image feature to obtain the upsampled second image feature comprises:
   determining, for a third pixel in the adjusted second image feature, a second pixel vector corresponding to the third pixel, the second pixel vector comprising elements of the third pixel in the at least two channels;
   mapping the second pixel vector by using a full-rank second matrix to obtain the mapped second pixel vector; and
   rearranging the mapped second pixel vector to determine at least two fourth pixels in the upsampled second image feature.

7. The image processing method according to claim 4, wherein the determining the image processing result comprises:
   performing convolution processing on the combined image feature to determine an image segmentation result with respect to the input image.

8. The image processing method according to claim 1, wherein the combining the first image feature and the second image feature comprises:
   determining a third weight adjustment parameter corresponding to the adjusted first image feature, and performing weight adjustment on each channel in the adjusted first image feature by using the third weight adjustment parameter, to obtain a further adjusted first image feature, the third weight adjustment parameter comprising at least two third parameter components, and each third parameter component being used for adjusting a pixel of a channel corresponding to each third parameter component;
   downsampling the further adjusted first image feature to obtain a third image feature having the second size; and
   performing an addition operation on the second image feature and the third image feature to determine the combined image feature.

9. The image processing method according to claim 8, wherein the determining the image processing result comprises:
   performing convolution processing, global pooling, and full connection on the combined image feature to determine an image classification result with respect to the input image.

10. The image processing method according to claim 1, wherein the combining the first image feature and the second image feature to obtain the combined image feature comprises:
    determining a third weight adjustment parameter corresponding to the adjusted first image feature, and performing weight adjustment on each channel in the adjusted first image feature by using the third weight adjustment parameter, to obtain a further adjusted first image feature, the third weight adjustment parameter comprising at least two third parameter components, and each third parameter component being used for adjusting a pixel of a channel corresponding to each third parameter component;

downsampling the further adjusted first image feature to obtain a third image feature having the second size; and concatenating the second image feature and the third image feature in a channel direction to determine the combined image feature.

11. The image processing method according to claim 10, wherein the determining the image processing result comprises:

performing convolution processing, full connection, and rearrangement on the combined image feature to determine an object detection result with respect to the input image.

12. The image processing method according to claim 1, wherein the combining the first image feature and the second image feature to obtain the combined image feature further comprises:

determining a third weight adjustment parameter corresponding to the adjusted first image feature, and performing weight adjustment on each channel in the adjusted first image feature by using the third weight adjustment parameter, to obtain a further adjusted first image feature, the third weight adjustment parameter comprising at least two third parameter components, and each third parameter component being used for adjusting a pixel of a channel corresponding to each third parameter component;

downsampling the further adjusted first image feature to obtain a third image feature having the second size;

combining the second image feature and the third image feature to obtain a fourth image feature having the second size;

determining a fourth weight adjustment parameter corresponding to the fourth image feature, and performing weight adjustment on each channel in the fourth image feature by using the fourth weight adjustment parameter, to obtain an adjusted fourth image feature, the fourth weight adjustment parameter comprising at least two fourth parameter components, and each fourth parameter component being used for adjusting a pixel of a channel corresponding to each fourth parameter component;

downsampling the adjusted fourth image feature to obtain a fifth image feature having a third size; and combining the first image feature, the second image feature, and the fifth image feature to obtain the combined image feature.

13. An image processing apparatus, comprising:

at least one memory configured to store program code; and at least one processor configured to read the program code and operate as instructed by the program code, the program code comprising:

feature determining code configured to cause the at least one processor to determine a first image feature of a first size of an input image, the first image feature having at least two channels;

adjustment code configured to cause the at least one processor to determine a first weight adjustment parameter corresponding to the first image feature, and perform weight adjustment on each channel in the first image feature by using the first weight adjustment parameter, to obtain an adjusted first image feature, the first weight adjustment parameter comprising at least two first parameter components, and each first parameter component being used for adjusting a pixel of a channel corresponding to each first parameter component;

downsampling code configured to cause the at least one processor to downsample the adjusted first image feature to obtain a second image feature having a second size, the second size being smaller than the first size;

combining code configured to cause the at least one processor to combine the first image feature and the second image feature to obtain a combined image feature; and result determining code configured to cause the at least one processor to determine an image processing result according to the combined image feature.

14. The image processing apparatus according to claim 13, wherein the adjustment code is further configured to cause the at least one processor to determine, for each channel in the at least two channels in the first image feature, a global feature parameter of each channel; and determine, by using the global feature parameter of each channel, a first parameter component used for adjusting a pixel of each channel in the at least two channels.

15. The image processing apparatus according to claim 13, wherein the downsampling code is further configured to cause the at least one processor to determine, for M×N first pixels in the adjusted first image feature, a first pixel vector corresponding to the M×N first pixels, the first pixel vector comprising elements of the M×N first pixels in the at least two channels, M and N being positive integers, and a product of M and N being a positive integer greater than 1; map the first pixel vector by using a full-rank first matrix to obtain the mapped first pixel vector; and determine a second pixel in the second image feature according to the mapped first pixel vector.

16. The image processing apparatus according to claim 13, wherein the combining code is further configured to cause the at least one processor to upsample the second image feature to obtain the upsampled second image feature; and concatenate the first image feature and the upsampled second image feature in a channel direction to obtain the combined image feature.

17. The image processing apparatus according to claim 16, wherein the combining code is further configured to cause the at least one processor to determine a second weight adjustment parameter corresponding to the second image feature, and perform weight adjustment on each channel in the second image feature by using the second weight adjustment parameter, to obtain an adjusted second image feature, the second weight adjustment parameter comprising at least two second parameter components, and each second parameter component being used for adjusting a pixel of a channel corresponding to each second parameter component; and upsample the adjusted second image feature to obtain the upsampled second image feature, the upsampled second image feature having the first size.

18. The image processing apparatus according to claim 17, wherein the combining code configured to cause the at least one processor to determine, for a third pixel in the adjusted second image feature, a second pixel vector corresponding to the third pixel, the second pixel vector comprising elements of the third pixel in the at least two channels; map the second pixel vector by using a full-rank second matrix to obtain the mapped second pixel vector; and
rearrange the mapped second pixel vector to determine at least two fourth pixels in the upsampled second image feature.

19. An image processing device, comprising at least one memory and at least one processor, the at least one memory being configured to store instructions executable by the at least one processor to cause the at least one processor to perform the image processing method according to claim 1.

20. A non-transitory computer-readable storage medium, storing instructions, the instructions, when executed by at least one processor, causing the at least one processor to perform:
  determining a first image feature of a first size of an input image, the first image feature having at least two channels;
  determining a first weight adjustment parameter corresponding to the first image feature, and performing weight adjustment on each channel in the first image feature by using the first weight adjustment parameter, to obtain an adjusted first image feature, the first weight adjustment parameter comprising at least two first parameter components, and each first parameter component being used for adjusting a pixel of a channel corresponding to each parameter component;
  downsampling the adjusted first image feature to obtain a second image feature having a second size, the second size being smaller than the first size;
  combining the first image feature and the second image feature to obtain a combined image feature; and
  determining an image processing result according to the combined image feature.

\* \* \* \* \*